United States Patent
Tamura

(10) Patent No.: US 7,762,132 B2
(45) Date of Patent: Jul. 27, 2010

(54) REFRIGERANT LIQUID LEVEL MEASURING DEVICE, REFRIGERANT LIQUID LEVEL MEASURING METHOD, AND SUPERCONDUCTING MAGNET DEVICE

(75) Inventor: Hajime Tamura, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 420 days.

(21) Appl. No.: 11/806,643

(22) Filed: Jun. 1, 2007

(65) Prior Publication Data
US 2008/0171663 A1 Jul. 17, 2008

(30) Foreign Application Priority Data
Jan. 17, 2007 (JP) ............................ 2007-008263

(51) Int. Cl.
*G01F 23/00* (2006.01)
(52) U.S. Cl. .................................... 73/290 R
(58) Field of Classification Search ............... 73/290 R
See application file for complete search history.

(56) References Cited

U.S. PATENT DOCUMENTS

| | | | | |
|---|---|---|---|---|
| 3,412,320 A | * | 11/1968 | Marshall | 324/322 |
| 6,717,408 B2 | * | 4/2004 | Minas et al. | 324/307 |
| 6,925,873 B2 | * | 8/2005 | Xu et al. | 73/304 R |

FOREIGN PATENT DOCUMENTS

| | | |
|---|---|---|
| JP | 53-32059 | 3/1978 |
| JP | 54-071664 A | 6/1979 |
| JP | 58-016452 | 3/1983 |
| JP | 62-141721 U | 9/1987 |
| JP | 03-009221 | 1/1991 |
| JP | 2006-093219 | 4/2006 |
| WO | 97/08518 A1 | 3/1997 |

OTHER PUBLICATIONS

Notification of Reasons for Refusal in JP 2007-008263 dated Jun. 2, 2009, and an English Translation thereof.

\* cited by examiner

*Primary Examiner*—Hezron Williams
*Assistant Examiner*—Alex Devito
(74) *Attorney, Agent, or Firm*—Buchanan Ingersoll & Rooney PC

(57) ABSTRACT

A refrigerant liquid level measuring device that measures a refrigerant liquid level in a short period is provided. A series sensor arrangement includes a plurality of sensor elements electrically connected in series. The sensor elements each have a superconducting wire and a normal conductor heater electrically connected to the wire, and the superconducting wire and the normal conductor heater are in thermal contact with each other. The series sensor arrangement is provided to cross the liquid level of refrigerant liquid in a container that stores the refrigerant liquid and one of the sensor elements and the other sensor elements in the series sensor arrangement are positioned on one another in the vertical direction. The series sensor arrangement is supplied with electric current, so that the liquid level of the refrigerant is measured by measuring the electrical resistance value of the normal conductive part of the super conducting wires in the series sensor arrangement.

3 Claims, 4 Drawing Sheets

REFRIGERANT LIQUID LEVEL MEASURING DEVICE, REFRIGERANT LIQUID LEVEL MEASURING METHOD, AND SUPERCONDUCTING MAGNET DEVICE

BACKGROUND OF THE INVENTION

1. Field of the Invention

This invention relates to a cryogenic device that uses a liquefied gas refrigerant such as liquid helium and liquid nitrogen, and more specifically to a refrigerant liquid level measuring device and a refrigerant liquid level measuring method for measuring the liquid level of a liquefied gas refrigerant and a superconducting magnet device including the device.

2. Description of the Related Art

In a superconducting magnet device as a cryogenic device in general, its superconducting coil must be maintained in a superconductive state. In a superconducting magnet device of a refrigerant liquid immersion type such as those immersed in liquid helium, the superconducting coil is immersed in the liquid helium and maintained at extremely low temperatures, so that the superconductive state is maintained. The superconducting magnet device keeps the liquid helium in a cryogenic container (cryostat) and prevents the liquid helium from being evaporated. However, it is impossible to completely prevent heat penetration from the outside, and therefore the liquid helium is gradually evaporated. Even in a superconducting magnet device provided with a refrigerator for condensing gas helium in the cryostat into liquid helium, the liquid helium is gradually evaporated and reduced as the magnet is excited and demagnetized. If the liquid helium is reduced, the cooling effect upon the superconducting coil becomes insufficient, which is likely to destroy the superconductive state and can give rise to quenching of the superconducting magnet. It is therefore critical to monitor the amount of the liquid helium in order to operate the superconducting magnet device, and most superconducting magnet devices include a helium liquid level measuring device.

The helium liquid level measuring device has the following structure. The helium liquid level measuring device includes a filament (superconducting wire) of a superconducting material such as a niobium-titanium alloy provided in the vertical direction so that the filament crosses the liquid level of the liquid helium in a cryostat. A normal conductor heater made for example of a manganese wire is electrically connected in series with the upper part of the superconducting filament, and the superconducting filament is thermally contacted to the heater to form a sensor element of the superconducting filament. When constant current as shown in FIG. 8 is passed through the sensor element of the superconducting filament, the heater generates Joule heat by the current, so that the superconducting filament above the liquid level of the helium attains a normal conductive state. The superconducting filament in the normal conductive part has electrical resistance, but the superconducting filament below the liquid level of the helium is kept in the superconductive state and the electrical resistance of the part is zero. The electrical resistance value of the superconducting filament at the time consists only of the resistance value of the part of the superconducting filament in the normal conductive state and changes depending on the length of the part of the superconducting filament above the liquid level. Therefore, voltage generated across both ends of the superconducting filament is measured using a voltmeter, and the resistance value is measured based on the passed current, so that the liquid level (the height of the liquid surface) can be obtained. Note that a similar liquid level measuring device is disclosed by International Publication No. 97/08518 pamphlet (Abstract and FIG. 1) or JP-UM-A-62-141721 (Claim for Utility Model Registration and FIG. 2).

However, according to the conventional method of measuring the liquid level of helium using the refrigerant liquid level measuring device using the superconducting wire, (1) the length of the superconducting wire that must attain a normal conductive state increases as the length of the refrigerant liquid level measuring device increases, and (2) the degree of the thermal contact between the heater and the superconducting wire varies within the range of working accuracy. For these reasons, it takes long before the boundary between the part of the superconducting wire in the superconductive state and the part in the normal conductive state to be lowered to reach the liquid level of the helium. The necessary time is greatly affected by individual differences in the degree of the thermal contact between the heater and the superconducting wire in the refrigerant liquid level measuring device. Therefore, using refrigerant liquid level measuring devices identical in design and structure, the time required for the boundary between the parts of the superconducting wire in the superconductive state and the normal conductive state to reach the liquid level of the helium significantly differs because of the individual differences, and therefore the liquid level cannot accurately be measured simply by passing uniform current for a uniform time period.

SUMMARY OF THE INVENTION

This invention is directed to a solution to the above-described problems, and it is an object of the invention to provide a refrigerant liquid level measuring device and a refrigerant liquid level measuring method that allow the boundary between the superconductive part and the normal conductive part of a superconducting wire to reach the same level as the helium liquid level by current passage in a short period and the refrigerant liquid level to be measured in a short period, and a superconducting magnet device including the device.

A refrigerant liquid level measuring device according to the invention includes a series sensor arrangement that includes a plurality of sensor elements electrically connected in series, the sensor elements each have a superconducting wire and a normal conductor heater electrically connected to the wire, and the superconducting wire and the normal conductor heater are in thermal contact with each other. The series sensor arrangement is provided to cross the liquid level of refrigerant liquid in a container that stores the refrigerant liquid, one of the sensor elements and the other sensor elements in the series sensor arrangement are positioned on one another in the vertical direction, and the series sensor arrangement is supplied with electric current, so that the liquid level of the refrigerant is measured by measuring the electrical resistance value of the normal conductive part of the superconducting wires in the series sensor arrangement.

A refrigerant liquid level measuring device according to the invention includes a series sensor arrangement that includes a plurality of sensor elements electrically connected in series, the sensor elements each have a superconducting wire and a normal conductor heater electrically connected to the wire, and the superconducting wire and the normal conductor heater are in thermal contact with each other. The series sensor arrangement is provided to cross the liquid level of refrigerant liquid in a horizontal cylindrical container that stores the refrigerant liquid, one of the sensor elements and the other sensor elements in the series sensor arrangement are positioned on one another in the vertical direction, the series sensor arrangement is provided to be curved or angular, and the series sensor arrangement is supplied with electric current, so that the liquid level of the refrigerant is measured by measuring the electrical resistance value of the normal conductive part of the super conducting wires in the series sensor arrangement.

A refrigerant liquid level measuring method according to the invention uses a refrigerant liquid level measuring device including a series sensor arrangement that includes a plurality of sensor elements electrically connected in series, the sensor elements each have a superconducting wire and a normal conductor heater electrically connected to the wire, the superconducting wire and the normal conductor heater are in thermal contact with each other, the series sensor arrangement is provided to cross the liquid level of refrigerant liquid in a container that stores the refrigerant liquid, one of the sensor elements and the other sensor elements in the series sensor arrangement are positioned on one another in the vertical direction, and the series sensor arrangement is supplied with a relatively large first current and then a relatively small second current, so that the liquid level of the refrigerant is measured by measuring the electrical resistance value of the normal conductive part of the superconducting wires in the series sensor arrangement.

A superconducting magnet device includes the refrigerant liquid level measuring device described above.

By the refrigerant liquid level measuring devices and the refrigerant liquid level measuring method according to the invention, each sensor element of the series sensor arrangement has a normal conductor heater. Therefore, if not only the upper sensor element but also other sensor elements underneath in the series sensor arrangement are in a refrigerant gas, the superconducting wire in the refrigerant gas can be brought into a normal conductive state in a short period and the boundary between the normal conductive part and the superconductive part of the superconducting wire in the series sensor arrangement can reach the same level as the refrigerant liquid level in a short period, so that the refrigerant liquid level can be measured in a short period.

Furthermore, in the refrigerant liquid level measuring device according to the invention, the series sensor arrangement is provided to cross the refrigerant liquid level in the horizontal cylindrical container that stores the refrigerant liquid, one of the sensor elements and the other sensor elements in the series sensor arrangement are positioned on one another in the vertical direction, and the series sensor arrangement is provided to be curved or angular. Therefore, changes in the refrigerant liquid level in the horizontal cylindrical container in a wide range can-be measured.

The foregoing and other objects, features, aspects and advantages of the present invention will be more apparent from the following detailed description of the present invention when taken in conjunction with the accompanying drawings.

DETAILED DESCRIPTION OF THE INVENTION

First Embodiment

Figure 1:
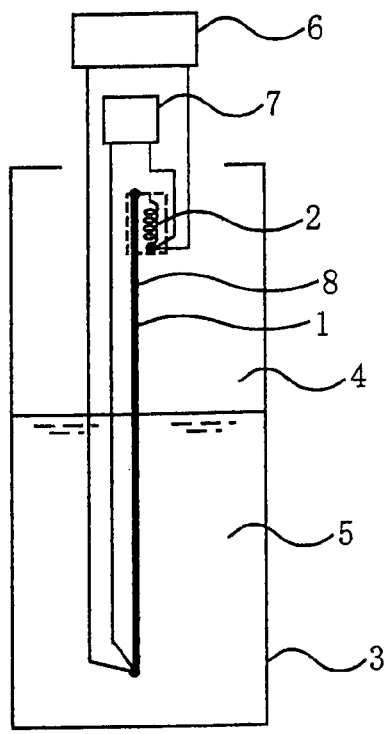
FIG. 1 is a view of a refrigerant liquid level measuring device for use in illustrating basic techniques according to the invention.
Figure 2:
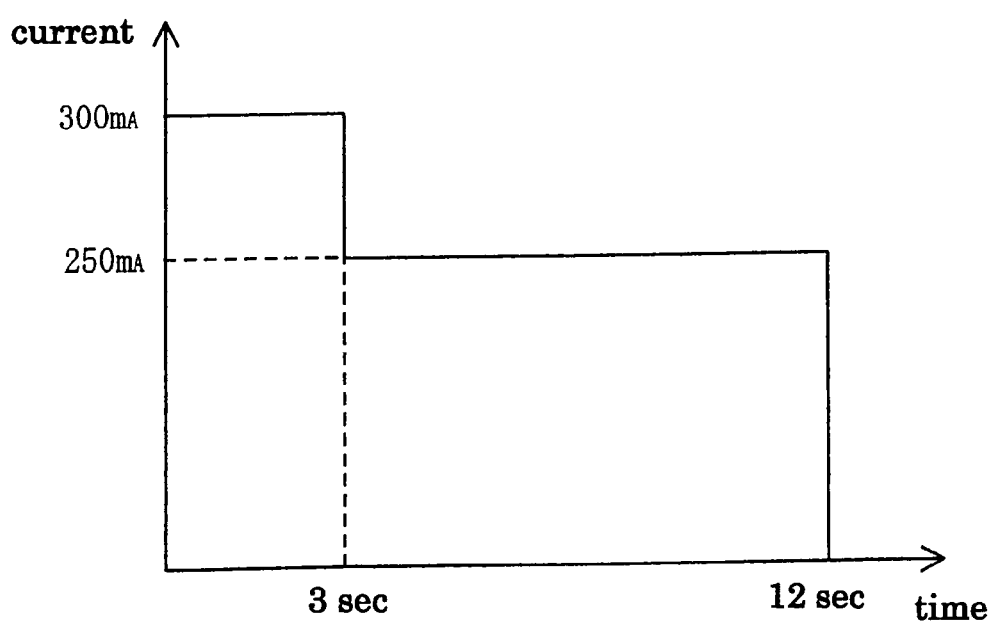
FIG. 2 is a chart showing the relation between current passed through the refrigerant liquid level measuring device and time.

Now, a first embodiment of the invention will be described in conjunction with the accompanying drawings. FIG. 1 is a view of a refrigerant liquid level measuring device for use in illustrating basic techniques according to the invention. FIG. 2 is a chart showing the relation between current passed through the refrigerant liquid level measuring device and time. A liquid helium refrigerant liquid level measuring device will be described by way of illustration. In FIG. 1, a superconducting filament 1 is a thin superconducting wire as long as a little less than one meter and made of a superconducting material such as a niobium-titanium alloy for example and has an electrical resistance of 60Ω when the entire wire attains a normal conductive state. A heater 2 is a normal conductor heater made for example of a manganin wire and has an electrical resistance of 2Ω. The superconducting wire 1 and the heater 2 are electrically connected in series and the heater 2 is in thermal contact with an upper part of the superconducting wire 1 as long as several centimeters. In order to alleviate handling them, the superconducting wire 1 and the heater 2 are accommodated for example in a metal or resin tube which has a plurality of through holes provided so that liquid helium can be let in/out to/from the tube. The superconducting wire 1 and the heater 2 produced in this way form a sensor element 8.

Leads on both ends of the sensor element 8 are connected with a power supply device 6 and a voltmeter 7. The power supply device 6 can pass current at a desired level to the sensor element 8 at the time of measurement. In FIG. 1, the current lead from the power supply device 6 and the voltage lead from the voltmeter 7 are led into a cryogenic container (cryostat) 3, while only a single lead may be provided inside the cryogenic container 3 and the lead may be branched at the outside. The upper voltage lead maybe connected between the superconducting wire 1 and the heater 2 to measure voltage at the superconducting wire 1. The sensor element 8 is provided to cross the liquid level of helium 5 in the vertical direction in the cryogenic container 3 and stored together with gas helium 4 and the liquid helium 5 in the cryogenic container 3. The sensor element 8 crosses the liquid level of the helium at right angles or obliquely.

Now, the operation will be described. As shown in FIG. 2, when the liquid level (the level of the liquid surface) of the liquid helium is measured, a current of 300 mA is passed from the power supply device 6 for the initial three seconds and then a current of 250 mA is passed for the next nine seconds. Before the end of the passage of 250 mA, voltage across both ends of the sensor element 8 is measured by the voltmeter 7. The superconducting wire 1 is in a superconductive state for its entire length before the current passage, but the heater 2 generates heat by the initial passage of 300 mA and the heat causes transition to a normal conductive state to advance from its upper part to its lower part, and the wire attains a normal conductive state to below the liquid level of helium 5 three seconds later. Subsequently, when the passed current is lowered to 250 mA, the cooling effect of the liquid helium 5 outweighs the heat by the heater 2 and Joule heat at the superconducting wire 1 in the normal conductive state, and therefore the superconducting wire 1 in the liquid helium goes through superconducting transition. Nine seconds after the start of passage of 250 mA, the boundary between the superconductive part and the normal conductive part of the superconducting wire 1 is equal to the liquid level of the helium, so that the voltage between the superconducting wire 1 and the heater 2, in other words, the voltage across both ends of the sensor element 8 is measured.

The electrical resistance R of the superconducting wire 1 for the generation voltage V when the passed current is 250 mA and the resistance of the heater 2 is 2Ω can be obtained from the following expression:

$$R[\Omega]=V[V]/0.25[A]-2[\Omega] \quad (1)$$

In this case, when the superconducting wire is in a normal conductive state for its entire length, the wire has an electrical resistance of 60Ω and therefore if for example R=30Ω, the liquid level of the helium is as high as half the length of the superconducting wire, and if for example R=20Ω, the liquid level of the helium is as high as one third the length of the superconducting wire from the top.

In this way, according to the liquid helium refrigerant liquid level measuring method, current greater than the current passed at the time of measuring the liquid level is initially passed through the sensor element 8, so that the part of the superconducting wire not only in the gas helium but also the part in the liquid helium is made to attain a normal conductive state. Then, the current for measurement is passed, it is awaited that the boundary between the superconductive part and the normal conductive part of the superconducting wire is raised to the same level as that of the liquid level of the helium, and the electrical resistance value of the normal conductive part of the superconducting wire of the sensor element is measured.

Figure 3:
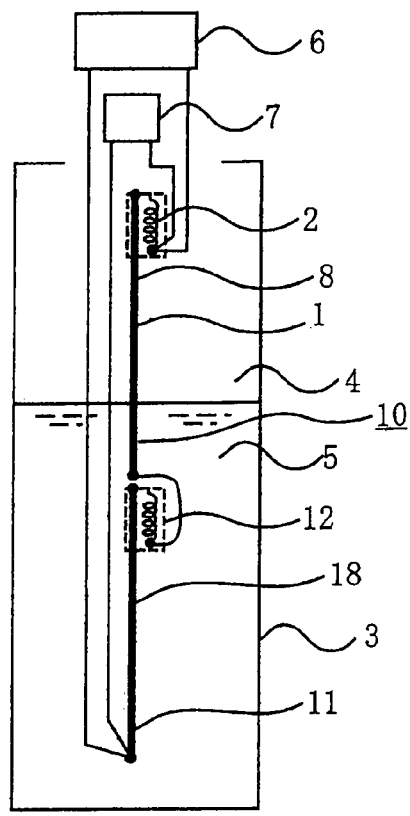
FIG. 3 is a view of a refrigerant liquid level measuring device according to a first embodiment of the invention.

FIG. 3 shows a refrigerant liquid level measuring device according to the first embodiment of the invention. In the drawings, the same reference characters refer to the same or corresponding portions, and therefore their description is partly omitted. A plurality of sensor elements 8 each including the superconducting wire 1 and the heater 2 produced similarly to FIG. 1 and stored in a metal or resin tube are prepared. In FIG. 3, in addition to a first sensor element 8, a second sensor element 18 including a superconducting wire 11 and a heater 12 is provided. The lower end lead of the first sensor element 8 (the lower end lead of the superconducting wire 1) and the upper end lead of the second sensor element 18 (the lead of the heater 12) are electrically connected, so that a series sensor arrangement 10 including the first sensor element 8 and the second sensor element 18 electrically connected in series is formed. Mechanically, the lower end of the superconducting wire 1 of the first sensor element 8 and the upper end of the superconducting wire 11 of the second sensor element 18 are arranged and supported with no gap therebetween in the height-wise direction.

The series sensor arrangement 10 is provided in the vertical direction to cross the liquid level of helium 5 at right angles or obliquely in the cryogenic container 3 and stored in the cryogenic container 3 together with the gas helium 4 and the liquid helium 5. One sensor element 8 in the series sensor arrangement 10 is positioned on the other sensor element 18 in the vertical direction in the cryogenic container 3. In this way, a plurality of sensor elements are electrically connected in series and positioned on one another in the vertical direction. In this manner, if the cryogenic container 3 has a large depth and the helium liquid level measuring device is not long enough, the number of sensor elements can be increased and connected in series, so that the liquid level can be measured without increasing the number of power supply devices 6 and the number of voltmeters 7.

According to the first embodiment, as in FIG. 2, a current of 300 mA is passed for the initial three seconds, then a current of 250 mA is passed for the next nine seconds, and the voltage is measured before the end of passing the current. In this way, the normal conductive state is propagated to the liquid helium, and then the current is dropped to 250 mA, so that the boundary between the superconductive part and the normal conductive part can be equal to the liquid level of the helium. In this example, the series sensor arrangement 10 has the two sensor elements 8 and 18 and the two heaters 2 and 12, and therefore the resistance value R can be obtained based on the measured voltage according to the following expression:

$$R[\Omega]=V[V]/0.25[A]-4[\Omega] \quad (2)$$

The electrical resistance R of the superconducting wire at the time is the total of the electrical resistance of the superconducting wire 1 of the sensor element 8 plus that of the superconducting wire 11 of the sensor element 18. In this case, the superconducting wires 1 and 11 each have an electrical resistance of 60Ω in a normal conductive state for the entire length, and therefore if R=90Ω for example, the liquid level of the helium is at the level of ¾ the length of the superconducting wires 1 and 11 (i.e., the series sensor arrangement 10) from the top. If R=30Ω, the liquid level of the helium is at the level of ¼ the length of the two superconducting wires 1 and 11 from the top.

In this way, according to the liquid helium refrigerant liquid level measuring method, current greater than current passed for the measurement of the liquid level is initially passed through the series sensor arrangement 10, so that not only the part of the superconducting wires 1 and 11 in the gas helium but also the part in the liquid helium is brought into a normal conductive state. Then, the current for the measurement is passed, so that the rise of the boundary between the superconductive part and the normal conductive part of the superconducting wires 1 and 11 to the same level as that of the helium liquid is awaited and the electrical resistance value of the normal conductive part of the superconducting wires 1 and 11 of the series sensor arrangement 10 may be measured highly precisely.

As described above, in the process of measuring the liquid level, there are the two stages in current magnitude, the time required for the process is shorter than the time necessary for the boundary between the superconductive part and the normal conductive part of the superconducting wire to be equal to the helium liquid level by passing the current for measurement from the start. If a heater is provided for each sensor element in this way, the process is less affected by individual differences in the degree of thermal contact between the superconducting wires and the heaters. Therefore, according to the method of measuring the refrigerant liquid level, the liquid level can be measured in a reduced period of time with high precision while being less affected by individual differences with uniform passage current and uniform current passage time.

According to the invention, the normal conductor heaters 2 and 12 are provided for the sensor elements 8 and 18 respectively in the series sensor arrangement 10, and therefore not only the upper-sensor element 8 but also the other lower sensor element 18 in the series sensor arrangement 10 can bring the superconducting wires 1 and 11 into a normal conductive state in a short period in the refrigerant gas. The boundary between the normal conductive part and the superconductive part of the superconducting wires 1 and 11 in the series sensor arrangement 10 can be brought to the same level as that of the refrigerant liquid level in a shorter period. Therefore, the refrigerant liquid level can be measured in a reduced period. If for example it takes two to six seconds to heat a superconducting wire as long as a little less than two meters in the refrigerant gas with a single heater so that the wire attains a normal conductive state, the time can be reduced to one to three seconds using the two normal conductor heaters 2 and 12 for the sensor elements 8 and 18 (each as long as a little less than one meter) in the series sensor arrangement 10 as shown in FIG. 3. Since the normal conductive state is attained in a reduced time, the consumption of the refrigerant liquid can be reduced accordingly.

When the sensor elements are heated so that they attain a normal conductive state, the time necessary for the elements to attain a normal conductive state is affected by individual differences in the degree of thermal contact between the heaters and the superconducting wires. The degree of the effect on the time necessary for bringing them into a normal conductive state is reduced by using a heater for each of the sensor elements as compared to the case of using only one heater for all.

Second Embodiment

Figure 4:
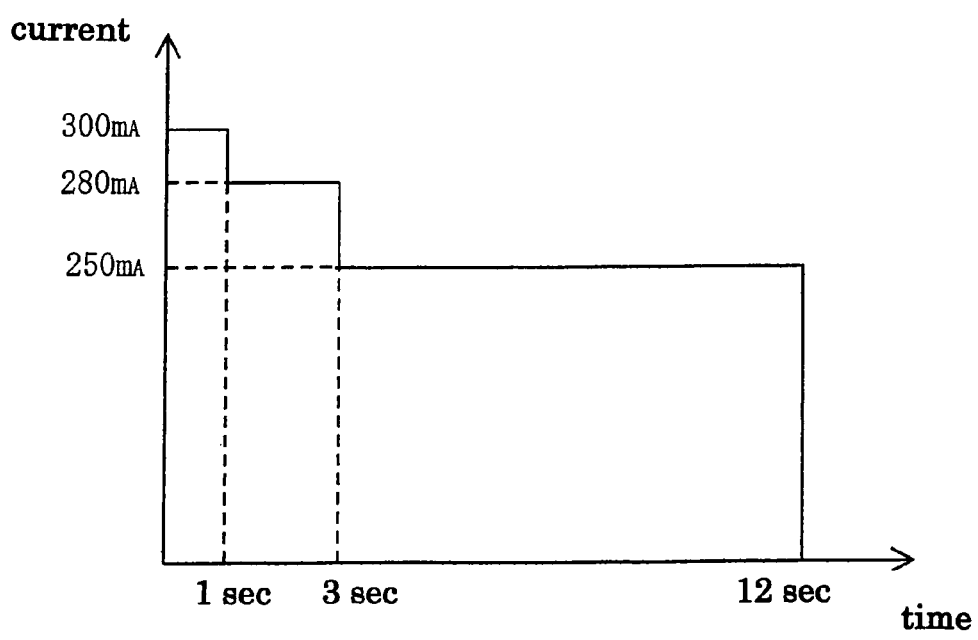
FIG. 4 is a chart showing changes with time in current passed through a refrigerant liquid level measuring device according to a second embodiment.

FIG. 4 is a chart showing changes with time in current passed through a refrigerant liquid level measuring device according to a second embodiment. As shown in FIG. 2, according to the first embodiment, a current of 300 mA is passed for the initial three seconds, followed by passage of a current of 250 mA for the next nine seconds, and its current passage curve is a one step curve, while according to the second embodiment, a current of 300 mA is passed initially, 280 mA is passed one second later, and 250 mA is passed three seconds later as shown in FIG. 4. More specifically, the current passage curve has two steps, and still the same function and effect as those of the first embodiment can be provided.

With an initial, relatively large passage current (such as 300 mA and 280 mA), the superconducting wires 1 and 11 can be brought into a normal conductive state as far as into the liquid helium, and with a subsequent, relatively small passage current (250 mA), the boundary between the superconductive part and the normal conductive part can be equal to the level of the liquid helium. The quantity of heat to be supplied to the heaters 2 and 12 and the superconducting wires 1 and 11 can be reduced by appropriately changing the passage current value from 280 mA, and the consumption of the liquid helium associated with the liquid level measurement can be reduced.

Third Embodiment

Figure 5:
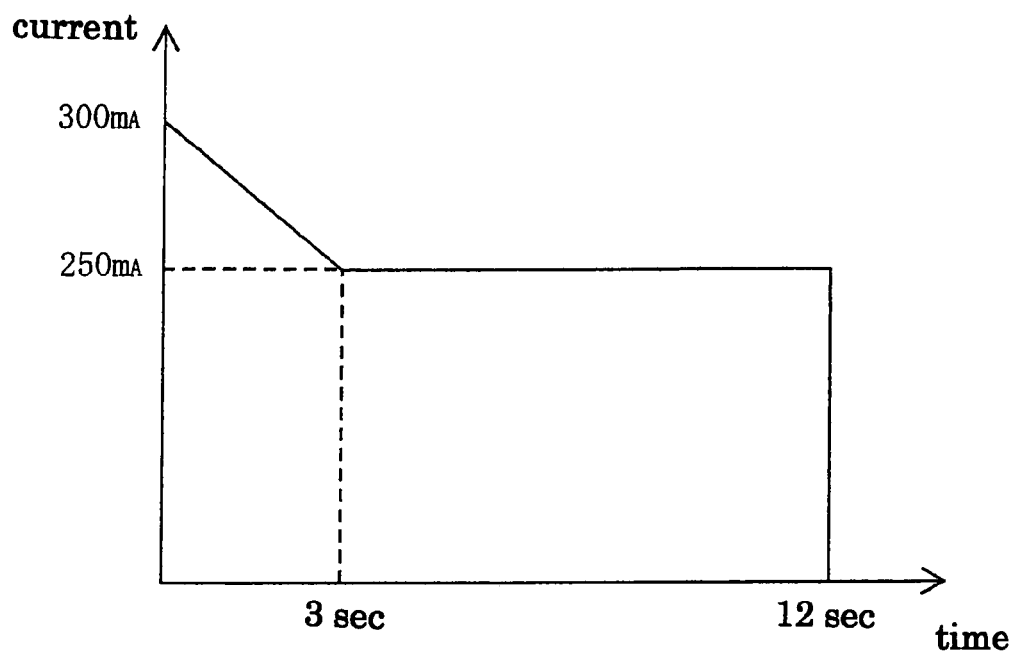
FIG. 5 is a chart showing changes with time in current passed through a refrigerant liquid level measuring device according to a third embodiment.

FIG. 5 is a chart showing changes with time in current passed through a refrigerant liquid level measuring device according to a third embodiment. According to the first and second embodiments, the passage current changes stepwise, while according to the third embodiment, the passage current is continuously gradually reduced and still the same function and effect as those of the second embodiment can be provided. According to the third embodiment, the inclination of the passage current during the period from one second to three second from the start may appropriately be adjusted, so that the quantity of heat to be supplied to the heaters 2 and 12 and the superconducting wires 1 and 11 can be reduced, and the consumption of the liquid helium associated with the liquid level measurement can be reduced.

Fourth Embodiment

Figure 6:
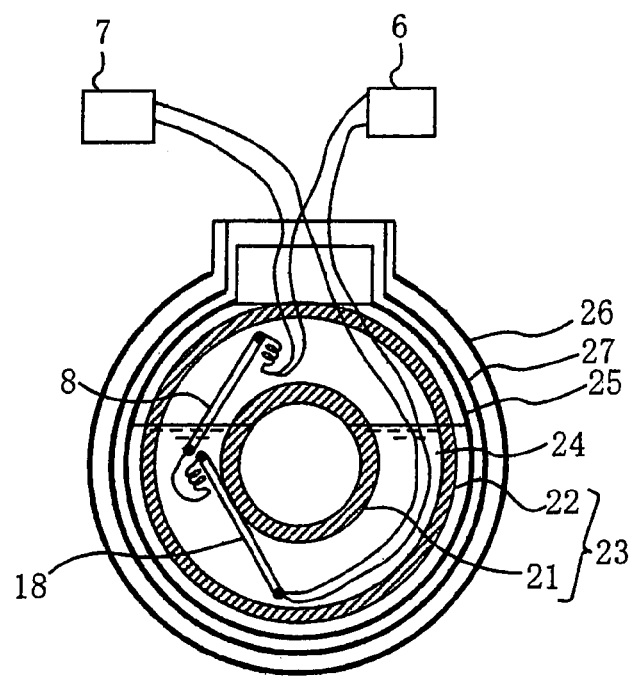
FIG. 6 is a sectional view of a refrigerant liquid level measuring device according to a fourth embodiment applied to a superconducting magnet device.

FIG. 6 is a sectional view of a refrigerant liquid level measuring device according to a fourth embodiment applied to a superconducting magnet device. According to the fourth embodiment, the refrigerant liquid level measuring device is applied to a horizontal magnetic field superconducting magnet device for use for example in a magnetic resonance imaging device that stores liquid helium in a horizontal cylindrical container. The superconducting magnet device has a superconducting coil 23 including a small size main coil 21 that generates a necessary magnetic field mainly in the center and a large size shield coil 22 that reduces the outer peripheral magnetic field of the superconducting magnet device, the superconducting coil 23 immersed in liquid helium 24 maintains its superconductive state, and is accommodated in a helium container 25 together with the liquid helium 24. The helium container 25 is stored in a vacuum container 26 maintained in a vacuum insulating state. The helium container 25 is surrounded by a heat shield 27 that mainly shields heat radiated from the vacuum container 26.

Similarly to the first embodiment, the sensor elements 8 and 18 each include a superconducting wire and a heater that are connected in series to form a series sensor arrangement. In the helium container 25 that is a horizontal cylindrical container, the sensor elements 8 and 18 of the series sensor arrangement are made to conform to the inside main coil 21 or supported as they are in an angular shape. The series sensor arrangement is connected to an externally provided power supply device 6 and a voltmeter 7. When the series sensor arrangement is provided vertically to the horizontal cylindrical container, the superconducting wire does not reach the upper and lower ends of the container. In this case, the measurement cannot be performed if the liquid level exists at the upper or lower end. If the sensor elements 8 and 18 are provided in the angular shape, the superconducting wires of the sensor elements 8 and 18 reach the upper and lower ends of the horizontal cylindrical container, and therefore measurement can be performed sufficiently even if the liquid level exists at the upper or lower end. If possible, the series sensor arrangement including the sensor elements 8 and 18 may be curved and provided in the horizontal cylindrical container.

Fifth Embodiment

Figure 7:
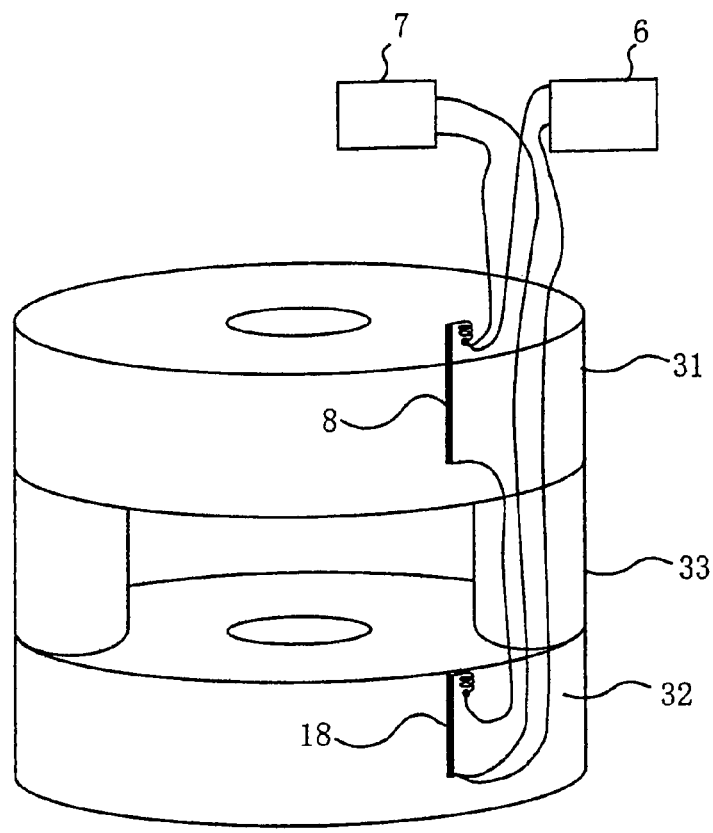
FIG. 7 is a perspective view of a refrigerant liquid level measuring device according to a fifth embodiment applied to a superconducting magnet device.
Figure 8:
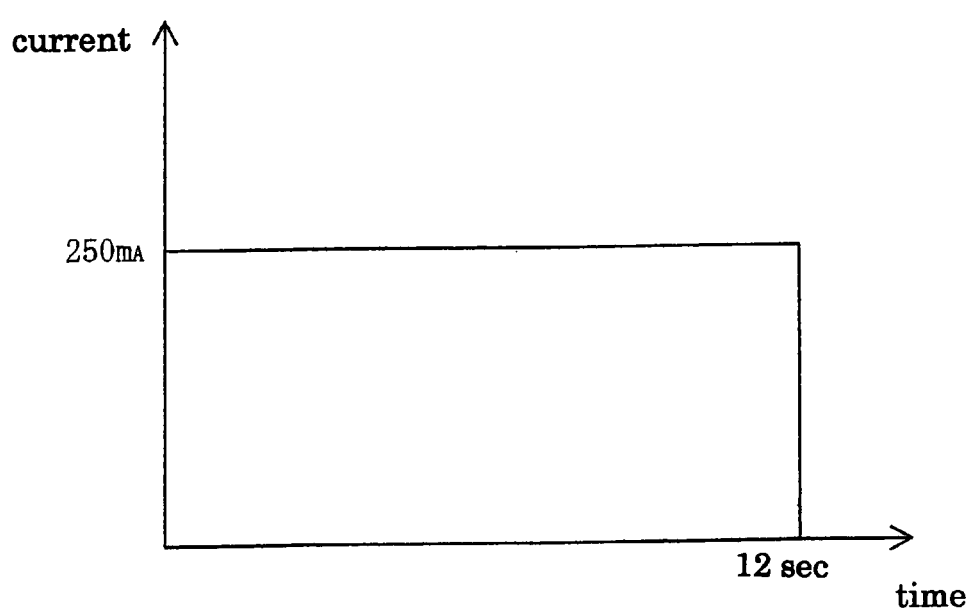
FIG. 8 is a chart showing the relation between conventional current passage through a refrigerant liquid level measuring device and time.

FIG. 7 is a perspective view of a refrigerant liquid level measuring device according to a fifth embodiment applied to a superconducting magnet device. According to the fifth embodiment, the refrigerant liquid level measuring device is applied to a vertical magnetic field superconducting magnet device for use for example in a magnetic resonance imaging device that stores liquid helium in a vertical two-stage cylindrical container. The superconducting magnet device shown in FIG. 7 includes an upper cylindrical container 31 and a lower cylindrical container 32 connected by a connection tube 33 that also serves as a pillar, so that liquid helium can be distributed inside the connection tube 33. The liquid level of the helium must be measured from the lower cylindrical container 32 to the upper cylindrical container 31. The measurement of the liquid level of the part of the connection tube 33 can be omitted because the capacity of the part of the connection tube 33 is small. The superconducting coil (not shown) is immersed in the liquid helium to maintain its superconductive state and stored in the vertical two-stage cylindrical container together with the liquid helium.

Similarly to the first embodiment, the sensor elements 8 and 18 each include a superconducting wire and a heater that are connected in series to form a series sensor arrangement. According to the fifth embodiment, the sensor element 8 of the series sensor arrangement is provided and supported in the upper cylindrical container 31 to cross the liquid level, while the sensor element 18 of the series sensor arrangement is provided and supported in the lower cylindrical container 32 to cross the liquid level. The sensor element 8 in the upper cylindrical container 31 and the sensor element 18 in the lower cylindrical container 32 are disconnected for the part corresponding to the connection tube 33 (the superconducting wires of the series sensor arrangement are disconnected), and a lead is used to connect the part through the connection tube 33. The series sensor arrangement is connected to the external power supply device 6 and the voltmeter 7.

In this way, the liquid level in the upper cylindrical container 31 and the lower cylindrical container 32 can be measured by providing the sensor elements 8 and 18 in the upper cylindrical container 31 and the lower cylindrical container 32, respectively.

While the presently preferred embodiments of the present invention have been shown and described, it is to be understood that the disclosures are for the purpose of illustration and that various changes and modifications may be made without departing from the scope of the invention as set forth in the appended claims.

What is claimed is:

1. A refrigerant liquid level measuring method that uses a refrigerant liquid level measuring device including a series sensor arrangement that includes a plurality of sensor elements electrically connected in series, said sensor elements each having a superconducting wire and a normal conductor heater electrically connected to the wire, said superconducting wire and said normal conductor heater being in thermal contact with each other, said series sensor arrangement being provided to cross the liquid level of refrigerant liquid in a container that stores the refrigerant liquid, one of said sensor elements and the other sensor elements in said series sensor arrangement being positioned on one another in the vertical direction, wherein said series sensor arrangement is supplied with a relatively large first current and then a relatively small second current, so that the liquid level of the refrigerant is measured by measuring the electrical resistance value of the normal conductive part of said superconducting wires, wherein current larger than current passed for measuring a refrigerant liquid level is passed, so that said superconducting wire in said series sensor arrangement not only in a refrigerant gas but also in the refrigerant liquid is brought into a normal conductive state, the current for measuring the refrigerant liquid level is then passed, it is awaited that the boundary between the superconductive part and the normal conductive part of said superconducting wire in said series sensor arrangement reaches the same level as the refrigerant liquid level, and the electrical resistance value of the normal conductive part of said superconducting wires in said series sensor arrangement is measured.

2. A refrigerant liquid level measuring method that uses a refrigerant liquid level measuring device including a series sensor arrangement that includes a plurality of sensor elements electrically connected in series, said sensor elements each having a superconducting wire and a normal conductor heater electrically connected to the wire, said superconducting wire and said normal conductor heater being in thermal contact with each other, said series sensor arrangement being provided to cross the liquid level of refrigerant liquid in a container that stores the refrigerant liquid, one of said sensor elements and the other sensor elements in said series sensor arrangement being positioned on one another in the vertical direction, wherein said series sensor arrangement is supplied with a relatively large first current and then a relatively small second current, so that the liquid level of the refrigerant is measured by measuring the electrical resistance value of the normal conductive part of said superconducting wires, wherein current larger than current passed for measuring a refrigerant liquid level is reduced stepwise, so that said superconducting wire not only in a refrigerant gas but also in the refrigerant liquid is brought into a normal conductive state, the current for measuring the refrigerant liquid level is then passed, and it is awaited that the boundary between the superconductive part and the normal conductive part of said superconducting wire reaches the same level as the refrigerant liquid level, so that the electrical resistance value of the normal conductive part of said superconducting wires in said series sensor arrangement is measured.

3. A refrigerant liquid level measuring method that uses a refrigerant liquid level measuring device including a series sensor arrangement that includes a plurality of sensor elements electrically connected in series, said sensor elements each having a superconducting wire and a normal conductor heater electrically connected to the wire, said superconducting wire and said normal conductor heater being in thermal contact with each other, said series sensor arrangement being provided to cross the liquid level of refrigerant liquid in a container that stores the refrigerant liquid, one of said sensor elements and the other sensor elements in said series sensor arrangement being positioned on one another in the vertical direction, wherein said series sensor arrangement is supplied with a relatively large first current and then a relatively small second current, so that the liquid level of the refrigerant is measured by measuring the electrical resistance value of the normal conductive part of said superconducting wires, wherein current larger than current passed for measuring a refrigerant liquid level is continuously reduced so that said superconducting wire not only in a refrigerant gas but also in the refrigerant liquid is brought into a normal conductive state, the current for measuring the refrigerant liquid level is then passed, and it is awaited that the boundary between the superconductive part and the superconductive part of said normal conductive part of said superconducting wire reaches the same level as the refrigerant liquid level, so that the electrical resistance value of the normal conductive part of said superconducting wires in said series sensor arrangement is measured.

* * * * *